(12) United States Patent
Beatty et al.

(10) Patent No.: US 8,065,278 B2
(45) Date of Patent: Nov. 22, 2011

(54) RESTORING SELECTED OBJECTS FROM A MONOLITHIC DATABASE BACKUP

(75) Inventors: Louis Beatty, Ormond Beach, FL (US); Steven R. DeVos, Kirkland, WA (US); Deepak Saraf, Windermere, FL (US)

(73) Assignee: Symantec Operating Corporation, Mountain View, CA (US)

( * ) Notice: Subject to any disclaimer, the term of this patent is extended or adjusted under 35 U.S.C. 154(b) by 371 days.

(21) Appl. No.: 12/242,014

(22) Filed: Sep. 30, 2008

(65) Prior Publication Data

US 2010/0082554 A1 Apr. 1, 2010

(51) Int. Cl.
G06F 7/00 (2006.01)
G06F 17/00 (2006.01)

(52) U.S. Cl. .................... 707/674; 707/679; 707/685

(58) Field of Classification Search .................... None
See application file for complete search history.

(56) References Cited

U.S. PATENT DOCUMENTS

| | | | |
|---|---|---|---|
| 7,200,621 B2 * | 4/2007 | Beck et al. | 707/661 |
| 7,418,619 B1 | 8/2008 | Uhlmann et al. | 714/2 |
| 7,694,103 B1 * | 4/2010 | Kushwah | 711/171 |
| 2004/0113943 A1 | 6/2004 | Cooper et al. | 345/744 |
| 2004/0204949 A1 | 10/2004 | Shaji et al. | 705/1 |
| 2005/0138087 A1 | 6/2005 | Beck et al. | 707/204 |
| 2005/0216788 A1 | 9/2005 | Mani-Meitav et al. | 714/6 |
| 2007/0130229 A1 * | 6/2007 | Anglin et al. | 707/204 |
| 2008/0034039 A1 | 2/2008 | Cisler et al. | 709/204 |
| 2008/0154919 A1 * | 6/2008 | Barlen et al. | 707/100 |

FOREIGN PATENT DOCUMENTS

| | | |
|---|---|---|
| EP | 1 693757 | 8/2006 |
| WO | WO 01/06366 | 1/2001 |
| WO | WO 2004/086226 | 10/2004 |
| WO | WO 2005/066839 | 7/2005 |
| WO | WO 2007/088084 | 8/2007 |

OTHER PUBLICATIONS

Beatty, Louis J. and Steven R. DeVos; U.S. Appl. No. 11/960,309, filed Dec. 19, 2007; entitled "Techniques for Recovery of Application Level Objects."
Louis Beatty et al., "Backing Up and Restoring Selected Versioned Objects From a Monolithic Database Backup," U.S. Appl. No. 12/242,079, filed Sep. 30, 2008, Specification pp. 1-26 and Drawings pp. 1-7.
Louis Beatty et al., "Backing Up and Restoring Security Information for Selected Database Objects," U.S. Appl. No. 12/242,136, filed Sep. 30, 2008, Specification pp. 1-29 and Drawings pp. 1-8.

* cited by examiner

Primary Examiner — Jay Morrison
(74) Attorney, Agent, or Firm — Campbell Stephenson LLP

(57) ABSTRACT

The present invention provides a mechanism to selectively restore portions of a monolithically backed up database, while maintaining hierarchical relationships and other metadata relationships of the restored portions of the database. Embodiments of the present invention provide a method, system and computer-readable storage medium that provides for receiving a request to restore a selected object from among a plurality of backed up objects in a database backup, locating information associated with the selected object in the database backup, and restoring the object-to-restore using the information associated with the selected object in a target area. Database table metadata is gathered from the backed up database at the time the backup was created in order to locate the information associated with the selected object.

20 Claims, 6 Drawing Sheets

RESTORING SELECTED OBJECTS FROM A MONOLITHIC DATABASE BACKUP

FIELD OF THE INVENTION

The present invention relates to a field of computer backups and restoration, and particularly to a method and system for selectively restoring objects from a monolithic database backup.

BACKGROUND OF THE INVENTION

An ever-increasing reliance on information and the computing systems that produce, process, distribute, and maintain such information in its various forms, continues to put great demands on techniques for storing, backing up, and restoring such information. As businesses adopt techniques for centralizing information resources across an enterprise to enable collaboration and document management, storage, backup and restoration of such information becomes even more critical to the functioning of the enterprise.

In a typical enterprise-level collaboration and document-management platform, data from one or more user-oriented application objects can be stored in a centralized storage object such as a database. The database maintaining the data from the variety of application objects can be configured to maintain data relationships, or hierarchies, imposed by the application objects. Any backup and restoration scheme for such a database must maintain the relationships and hierarchies of the data created by the application objects.

Traditional methods of backing up and restoring such a database are both personnel and resource intensive. For example, given that there are a multitude of application object-based areas in the database, a backup administrator would be responsible for knowing and selecting those portions of the database that are necessary to protect. Such an up-front, granular approach to data protection requires that the backup administrator, who may not be the database administrator, know the topology of the database in order to build a protection schema for a particular application object. Further, any changes made to the hierarchical object structure for an application would need to be taken into account by the backup administrator upon occurrence of those changes. This traditional backup approach is called a granular backup scheme because the areas in the database associated with each application object are backed up separately. Under a granular backup scheme, restoration of data related to a particular application object can be reasonably targeted because each application object has its own set of backups.

An alternate method of backup is to backup the entire database monolithically. A traditional method of restoring data from such a monolithic backup of the database is to restore the entire database snapshot to a temporary area and then select the desired information from the database to include in an active target database. Drawbacks of such a back-end method of data selection are that it takes time to restore all the data from a database backup from which the desired information would then be selected and disk resources are consumed by the temporary copy of the database.

It is therefore desirable to have a mechanism that realizes the efficiency of monolithically backing up the entire database, thereby not requiring that a backup administrator be familiar with the structure of the database being backed up. It is further desirable that a user be able to selectively restore portions of the backed up database when desired so as to speed recovery time.

SUMMARY OF THE INVENTION

Embodiments of the present invention provide a mechanism to selectively restore portions of a monolithically backed up database, while maintaining hierarchical relationships and other metadata relationships of the restored portions of the database. Embodiments of the present invention provide a method, system and computer-readable storage medium that provides a mechanism for receiving a request to restore a selected object from among a plurality of backed up objects in a database backup, locating information associated with the selected object in the database backup, and restoring the selected object to a target area using the information associated with the selected object. Aspects of the above embodiments use database table metadata gathered from the backed up database at the time the backup was created in order to locate the information associated with the selected object.

A further aspect of the above embodiments of the present invention provides for restoring each object in the database backup necessary to the restoration of the selected object, including any objects having a parent (or greater) relationship to the selected object in a hierarchy of objects including the selected object. Other aspects of the above embodiments of the present invention provide for the database table metadata to include offsets to database tables stored in the backup and information describing structure of the database tables.

Further aspects of the present invention provide for use of the present invention in conjunction with restoring sections of a SharePoint® database. In such instances, the selected object may be a Site object, a Web object, a List object, and the like. Tables describing such selected objects can include a Sites table, a Webs table, a Lists table, a UserData table, a UserInfo table, a Groups table, a Roles table, and the like.

The foregoing is a summary and thus contains, by necessity, simplifications, generalizations and omission of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

DETAILED DESCRIPTION

Embodiments of the present invention provide a mechanism for selectively restoring application object data from a monolithic backup of a database storing the application object data. Embodiments of the present invention provide this capability by identifying, at the time of the database backup, metadata stored in the database that describes the application object data, structures that the application object data is stored within, and interrelationships between those structures. Embodiments of the present invention can store information regarding this metadata to be used during restore operations. During a restore operation, embodiments of the present invention can access the stored information related to the metadata and use that information to directly access the metadata within the database backup. Embodiments of the present invention use the accessed metadata to provide a description of the data backed up from the database and the relationships between such data (e.g., a hierarchy of data structures) to a user restoring data. Embodiments of the present invention can further access data selected from such a description from the database backup and restore that information to a target database. In this manner, a database comprising data from one or more application objects can be efficiently backed up in a monolithic fashion, and then be efficiently restored in a targeted fashion. Further, personnel resources are more efficiently utilized in that a backup administrator need not be familiar with the structure of a database being backed up, leaving structural familiarity to a person restoring a specific set of data.

Figure 1:
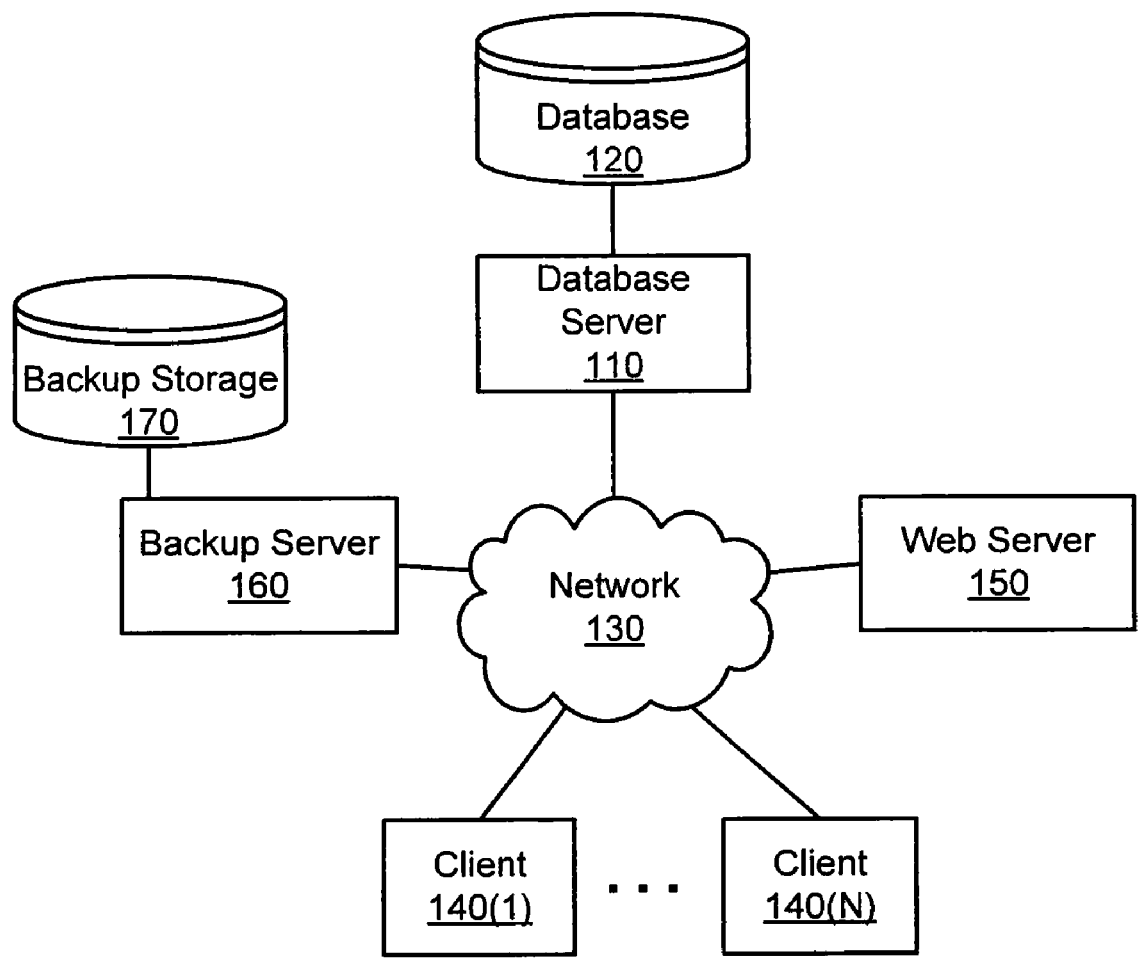
FIG. 1 is a simplified block diagram illustrating an example of a network configurable to employ embodiments of the present invention.

FIG. 1 is a simplified block diagram illustrating an example of a network configurable to employ embodiments of the present invention. A database server 110 is coupled, directly or indirectly, to storage volumes storing a database 120. Database 120 can be accessed by one or more application objects that store data in database 120. Database server 110 is coupled to a network 130 that provides access to and from the database server. Network 130 is typically an enterprise-level network for an organization, and can include, without limitation, local area networks, metro area networks, wide area networks, and the like. Network 130 can be supported by standard networking hardware and protocols, including, for example, ethernet routers, optical cabling, and the like. Network 130 can also couple computer equipment in one or more locations of an enterprise (e.g., clients 140(1)-(N)), thereby providing communication from those clients to database server 110.

The network illustrated in FIG. 1 is also coupled to web server 150. Web server 150 can provide user access to an application associated with one or more application objects. Network 130 can have one or more web servers 150 each providing a separate application or multiple web servers distributing the same application. Web server 150 provides an application object model to access data stored in database 120 by communicating with database server 110. Such communication between web server 150 and database server 110 can be via an application program interface (API) shared by the application objects served by web server 150 and database server 110.

A backup server 160 is coupled to network 130 and is configured to store backup images of data stored on network 130 in one or more backup storage volumes 170. Backup server 160 can be configured to run a variety of types of backup utilities that provide snapshots of data on the network at the time the backup is performed. Backup server 160 can, for example, backup a database 120 by directly accessing the data via database server 110. In this manner, a full monolithic backup of database 120 can be performed via the database server's SQL interface without regard to the specific data structures stored within the database. Alternatively, if a specific portion of database 120 is desired to be backed up, backup server 160 can access a particular application object's data via the associated application's web server 150. In this manner, a granular backup of a particular application object stored in database 120 can be performed.

A downside to performing a granular backup, as described above, is that the resources of web server 150 associated with the particular application are consumed. This consumption of web server resources can slow or halt access to the served application during the time of backup. By directly backing up the database via database server 110, consumption of web server resources is avoided. But, in a traditional backup scheme, restoration of specific application object data can then only be performed by restoring the entire database and then selecting data from that restored database. Such a restore and selection operation consumes both time and physical resources (e.g., disk space required to store the fully restored backup).

Figure 2:
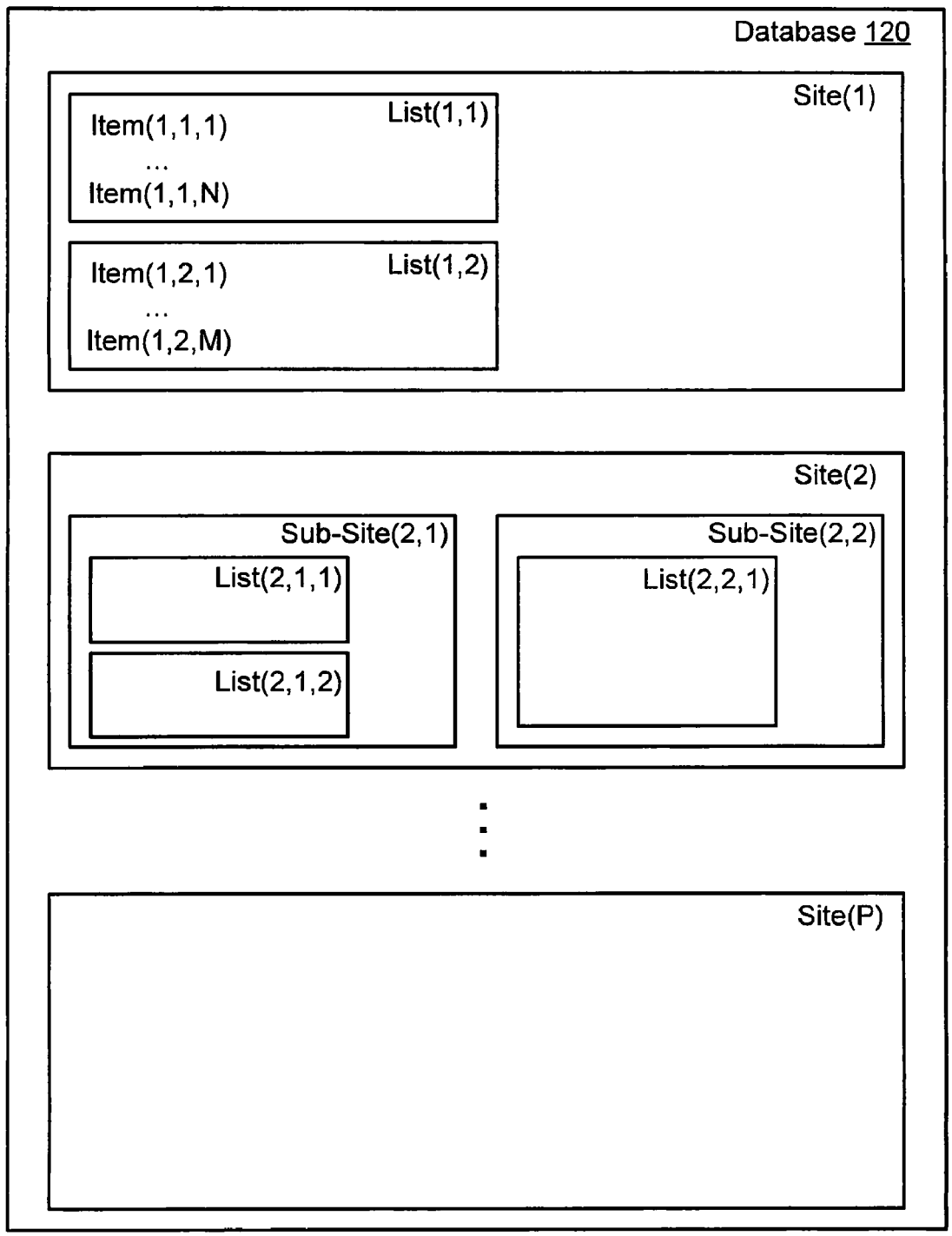
FIG. 2 is a simplified block diagram illustrating an example of an object layout within a database that is usable in conjunction with embodiments of the present invention.

FIG. 2 is a simplified block diagram illustrating an example of an object layout within a database 120 that is usable in conjunction with embodiments of the present invention. Database 120 contains one or more containers labeled Site (1)-(P). Each Site can be associated with a specific application. Each Site is therefore an application object having a unique set of characteristics defined by the Site's association with a particular application. A Site can have, for example, an associated URL, a unique identifier, an owner identifier, associated security information, associated disk quotas and disk usage information, and the like. One or more Sites can be associated with a particular application, depending on the nature of the application.

Sites can be associated with other containers. For example, Site(2) includes two Sub-Site containers: Sub-Site(2,1) and Sub-Site(2,2). Each Sub-Site can include associated information describing the Sub-Site, as described above for a Site. While each Sub-Site is associated with the parent Site, the Sub-Sites themselves are disjoint objects.

Sites and Sub-Sites can further contain other application objects. An example of one such application object is a List, which is also a container. FIG. 2 illustrates Site(1) having associated List objects (e.g., List(1,1) and List(1,2)). Sub-Site (2,1) also has associated Lists (e.g., List(2,1,1) and List(2,1, 2)). On the other hand, Sub-Site(2,2) has a single List (e.g., List(2,2,1)). List objects can also have associated information that can include, for example, an identifier of the site to which the List belongs, a name of the List, creation date and time information, security information, a type of the List (e.g., the type of information stored within the List), and the like. In addition to such characteristics directly associated with a List, a List can also inherit characteristics associated with a Site and/or a Sub-Site containing the List. Thus, for example, a List can acquire security protections associated with a Site with which the List is associated.

As illustrated in FIG. 2, a List can contain associated items or data objects. Each List can be associated with a specific type of item. Item objects can have associated characteristics such as an identifier associating the item with a particular List and/or Site, an identifier of a user who entered or modified the item, the type of data associated with the item, and a value of the item object. Again, an item can also inherit characteristics of a List to which the item belongs and/or a Site or Sub-Site with which the item is associated.

A database 120 can not only store the containers and their associated data, but also metadata descriptions of the containers and their associated data, including their interrelationships. A database 120 can store such metadata in tables associated with Lists, items, Sites, and Sub-Sites, and the like. Indeed, a separate metadata table can be provided for each type of application object stored within database 120.

An example of a system using a database as described, is Microsoft®'s SharePoint® application. While embodiments of the present invention are not limited to use in conjunction with SharePoint® databases, embodiments of the present invention can be used with SharePoint® databases and examples will be provided below using SharePoint® terminology. It should be understood that the use of such terminology is not meant to be limiting, and embodiments of the present inventions can be used with a variety of applications that store data in objects in a database environment.

It should be further noted that the relationship between Sites, Sub-Sites, Lists and items is a hierarchical relationship. As discussed above, child objects within an application object hierarchy can inherent characteristics of parent objects. Further, using the container analogy discussed above, a child container object such as a List is contained within a parent Sub-Site or Site. Thus, in order to restore the child object to a target database, any parent objects that are not already restored must first be restored in order for the child object to be properly and completely restored within the target database. This allows the child to both be properly placed in the hierarchy and to inherit characteristics from the child's parent objects.

Figure 3:
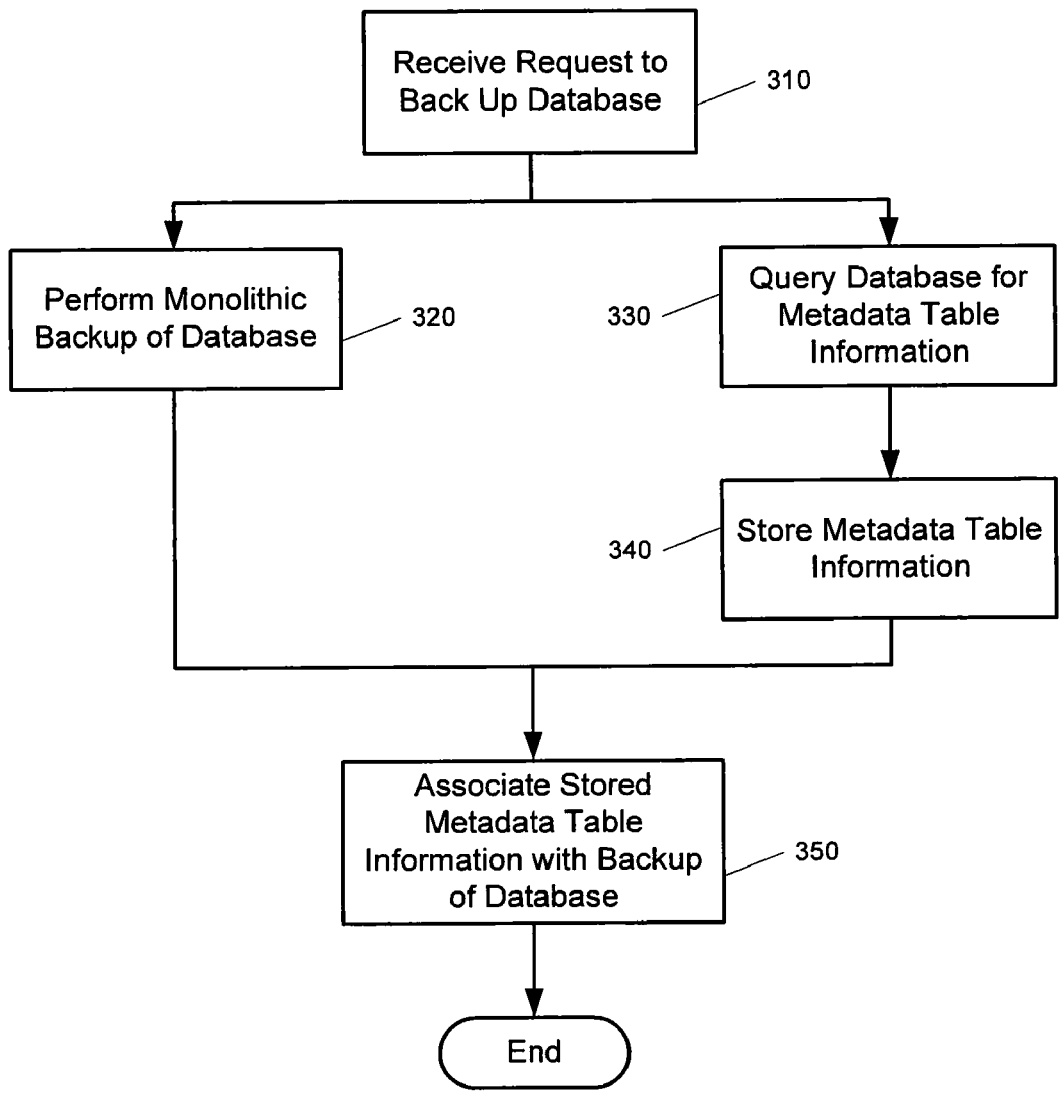
FIG. 3 is a simplified flow diagram illustrating a backup process in accord with embodiments of the present invention.

FIG. 3 is a simplified flow diagram illustrating a backup process in accord with embodiments of the present invention. A backup server 160 can receive a request to backup a database 120 (310). At this point, two processes are initiated. These processes can occur concurrently or sequentially but close enough in time that structures with database 120 are the same. A monolithic backup of the database is performed (320). Such a backup can be a snapshot of database 120 including all the information related to that database at the time of backup. The monolithic backup is performed using a direct interaction between the backup server and the database server. The backup is not performed using the application object model supplied by, for example, web server 150.

Additionally, database 120 can be queried for metadata table information (330). Metadata table information includes information about the tables containing the characteristics of the various object structures within database 120. Table information that is sought can include, an index of the table, an offset of the table within the database (e.g., the location of the table), a name of the table, and a structure of the table. In this manner, information is gathered that identifies and locates each table describing an object of interest within database 120.

Embodiments of the present invention gather this metadata table information so that the tables can be accessed upon restore operations. Thus, sufficient information to allow such metadata table access is gathered, but not the information actually stored within the tables themselves. Once the metadata table information is gathered, the metadata table information can be stored (340). Such storage can take the form, for example, of a list of tables. An example of a utility that can perform such access and storage of metadata table information is described in pending U.S. patent application Ser. No. 11/960,309, entitled "Techniques for Recovery of Application Level Objects," which is incorporated by reference for all that it discloses.

Once the backup is complete and the metadata table information has been stored, the metadata table information is associated with the backup of the database (350). Such an association enables access to the stored list of metadata table information during restore operations.

Figure 4:
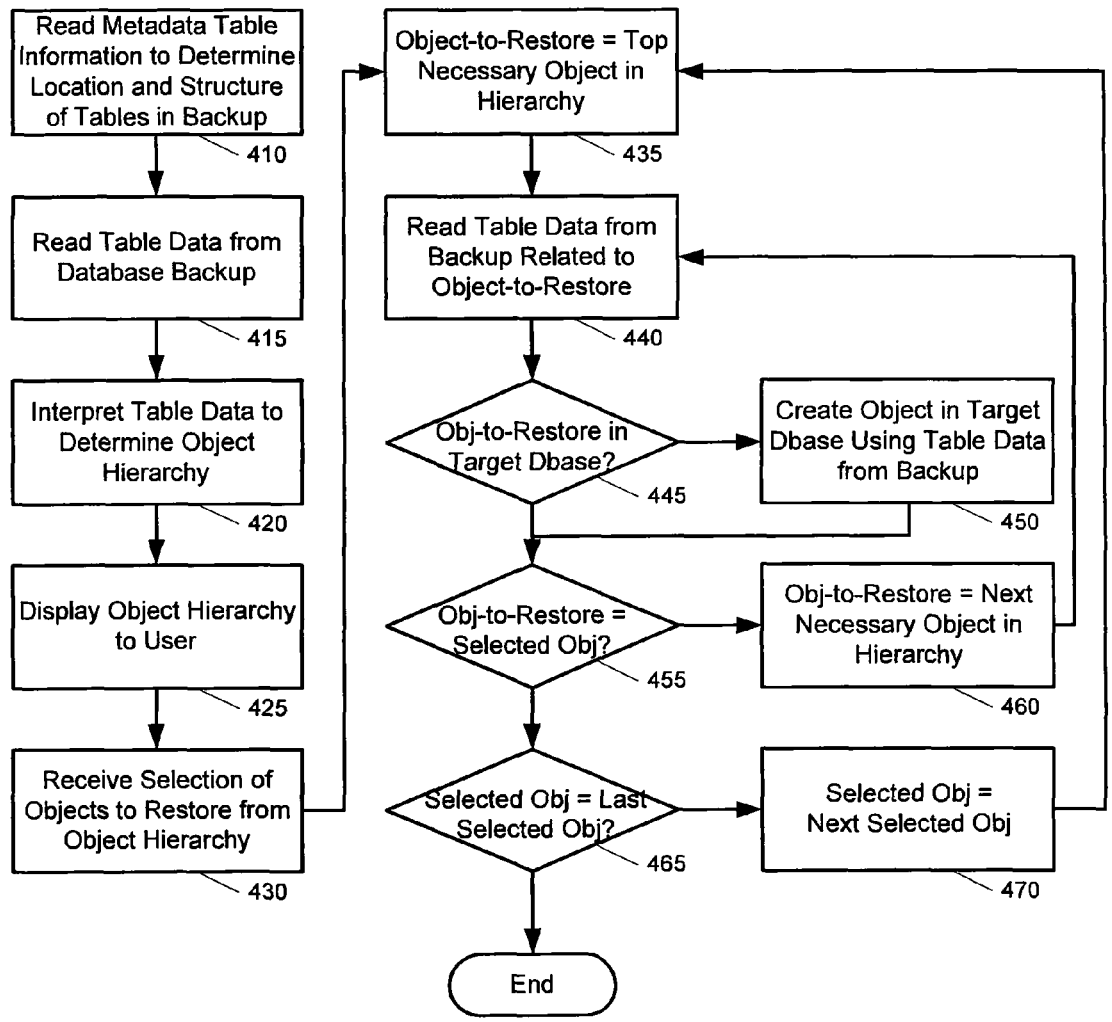
FIG. 4 is a simplified flow diagram illustrating a database restore operation in accord with embodiments of the present invention.

FIG. 4 is a simplified flow diagram illustrating a database restore operation, in accord with embodiments of the present invention. In response to a user request to restore application object information from a specified backup, a restore utility can read metadata table information associated with the specified backup to determine locations and structures of tables describing application objects in the backup (410). The restore utility can then use the information from the metadata table's information to read the table data directly from the backup (415). Once the table data has been read, that data can then be interpreted to determine a hierarchy of application objects within the database backup (420). The interpreted object hierarchy can then be displayed to a user (425). The user can then review the displayed object hierarchy to determine those objects that the user wishes to restore. A user can select an object at any level of the hierarchy.

Once the user selects the desired objects for restore, the restore utility can receive the object selections (430). At this point, the restoration utility begins restore operations to restore all the objects in the hierarchy necessary to restoring each selected object. For example, if a List object is selected, then any Site or Sub-Site objects with which the List object is associated are also subject to restore operations. As discussed above, this is because a List object, as a child of a Site object, inherits certain characteristics of the parent object. Thus, the restoration utility goes through a series of steps to restore the hierarchy.

Thus, the top object in a hierarchy necessary to restore a selected object becomes the first object-to-restore (435). The restore utility reads metadata table data from the backup related to the object-to-restore (440). Again, information necessary to locating the appropriate metadata table or tables associated with the object-to-restore can be read from the metadata table information associated with the backup. Once the information related to the object-to-restore has been read from the table, a determination is made as to whether the object-to-restore is already present in the target database (445). If the object-to-restore is not already present in the target database, then the object-to-restore is created in the target database using the table data read from the backup (450). Restoration of the object-to-restore can be performed by supplying the object-related information to an application object model served by, for example, web server 150. By using the application object model to generate the object-to-restore in the target database, consistency of structures with their associated application is ensured.

Subsequent to creating the object in the target database or determining that that object has already been restored, a determination is made as to whether the object-to-restore is the same as the object selected for restore by the user (455). If the object-to-restore is not the object selected by the user, then a next object-to-restore is selected which is a next object in the hierarchy necessary to restoring the selected object (460). Then, processing returns once again to reading the table data from the backup related to the new object-to-restore (440) and the process repeats as described above.

If the object-to-restore was the object selected by the user (455), then a determination is made as to whether the selected object was the last selected object by the user (465). That is, a determination is made as to whether each object selected by the user has now been restored. If not, then the next selected object is targeted for restore and the process returns to a determination of the top object in the hierarchy necessary to restore the next selected object (435), and the process repeats as described above. If the selected object was the last object selected by the user (465), then the restoration process is complete.

By using the restoration method described above, an entire hierarchy necessary to support a selected object within a backed up database can be restored to a target database. In addition, all the characteristics of that object are restored by accessing the tables stored within the database backup that contain the characteristics necessary to describe the requested object. If an object needs to be created in the target database (e.g., step 450), the restore utility can access an application web server 150 associated with the object to create the object in the target database using the characteristics information pulled from the backup table. In this manner, the structures necessary for the application to access the object can be created automatically by the application object model and, at the same time, the necessary characteristics information describing the object are provided from the backup.

Using such a restore technique, containers can be created within the target database that have the same characteristics as the associated containers in the backed up database. A user could therefore create a structure within a target database that is the same as that in the backed up database, but which can be available for data other than that which was stored in the backed up database. That is, the backed up database serves as a template for the target database. Data can also be restored from the backed up database to the target database. Once the appropriate containers have been configured in the target database, a direct access to the database server can be made between database server and the backup server for a more rapid and efficient restoration of data to the appropriate structures in the target database, if desired.

An Example Computing and Network Environment

As shown above, the present invention can be implemented using a variety of computer systems and networks. An example of one such computing and network environment is described below with reference to FIGS. 5 and 6.

Figure 5:
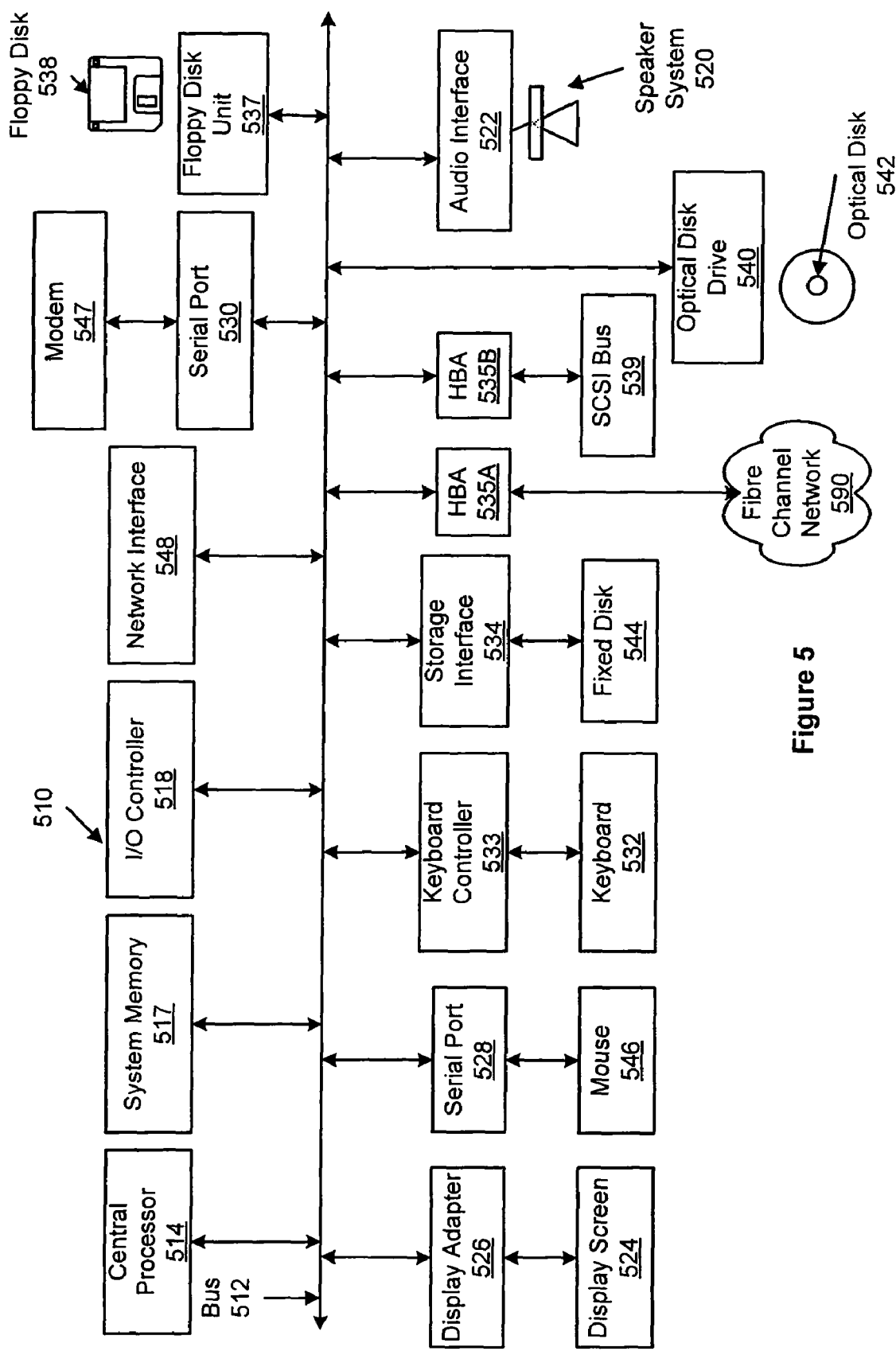
FIG. 5 depicts a block diagram of a computer system suitable for implementing embodiments of the present invention.

FIG. 5 depicts a block diagram of a computer system 510 suitable for implementing aspects of the present invention (e.g., clients 140, backup server 160, database server 110, and web server 150). Computer system 510 includes a bus 512 which interconnects major subsystems of computer system 510, such as a central processor 514, a system memory 517 (typically RAM, but which may also include ROM, flash RAM, or the like), an input/output controller 518, an external audio device, such as a speaker system 520 via an audio output interface 522, an external device, such as a display screen 524 via display adapter 526, serial ports 528 and 530, a keyboard 532 (interfaced with a keyboard controller 533), a storage interface 534, a floppy disk drive 537 operative to receive a floppy disk 538, a host bus adapter (HBA) interface card 535A operative to connect with a Fibre Channel network 590, a host bus adapter (HBA) interface card 535B operative to connect to a SCSI bus 539, and an optical disk drive 540 operative to receive an optical disk 542. Also included are a mouse 546 (or other point-and-click device, coupled to bus 512 via serial port 528), a modem 547 (coupled to bus 512 via serial port 530), and a network interface 548 (coupled directly to bus 512).

Bus 512 allows data communication between central processor 514 and system memory 517, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 510 are generally stored on and accessed via a computer-readable medium, such as a hard disk drive (e.g., fixed disk 544), an optical drive (e.g., optical drive 540), a floppy disk unit 537, or other storage medium. Additionally, applications can be in the form of electronic signals modulated in accordance with the application and data communication technology when accessed via network modem 547 or interface 548.

Storage interface 534, as with the other storage interfaces of computer system 510, can connect to a standard computer-readable medium for storage and/or retrieval of information, such as a fixed disk drive 544. Fixed disk drive 544 may be a part of computer system 510 or may be separate and accessed through other interface systems. Modem 547 may provide a direct connection to a remote server via a telephone link or to the Internet via an internet service provider (ISP). Network interface 548 may provide a direct connection to a remote server via a direct network link to the Internet via a POP (point of presence). Network interface 548 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 5 need not be present to practice the present invention. The devices and subsystems can be interconnected in different ways from that shown in FIG. 5. The operation of a computer system such as that shown in FIG. 5 is readily known in the art and is not discussed in detail in this application. Code to implement the present invention can be stored in computer-readable storage media such as one or more of system memory 517, fixed disk 544, optical disk 542, or floppy disk 538. The operating system provided on computer system 510 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 6:
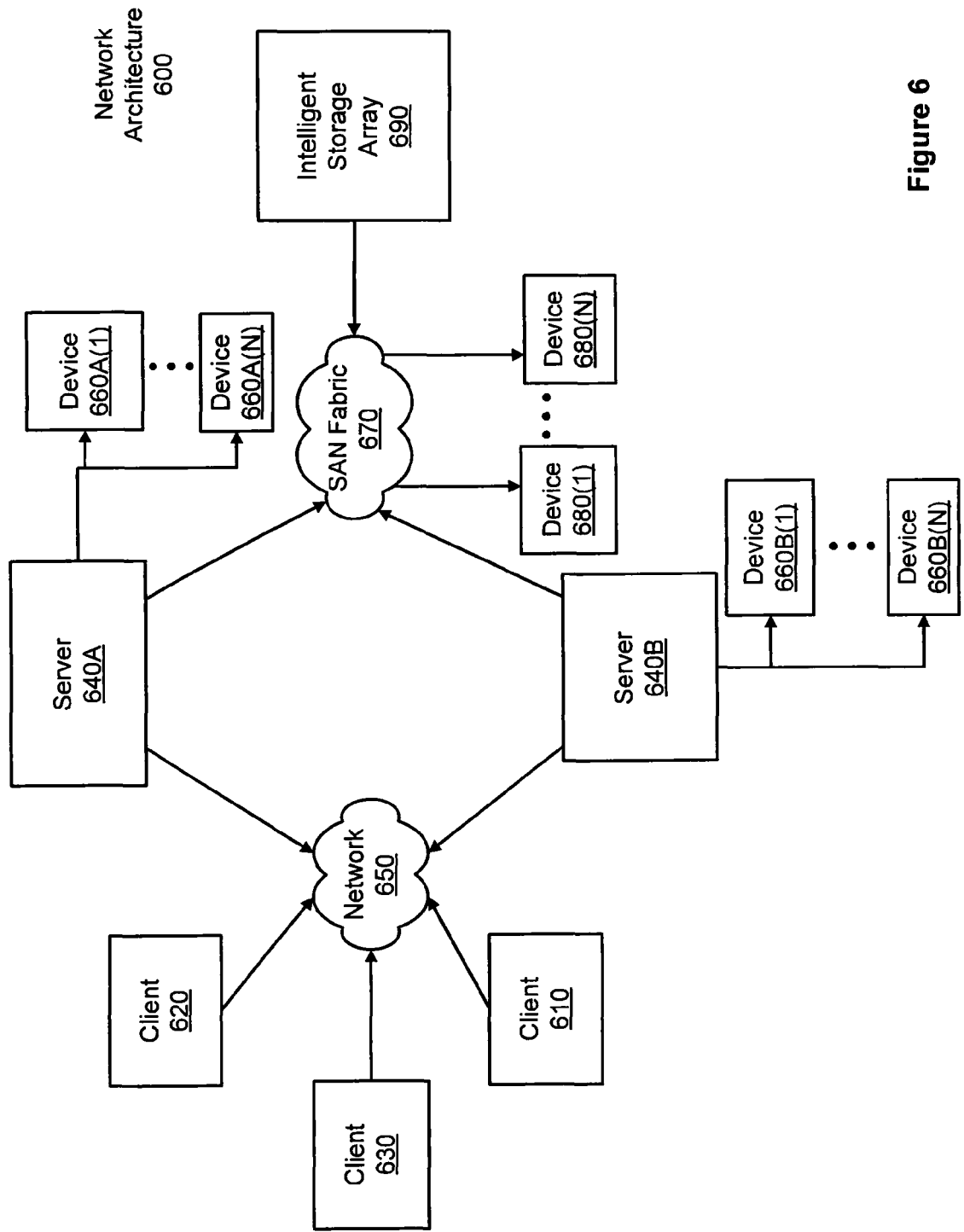
FIG. 6 is a block diagram depicting a network architecture suitable for implementing embodiments of the present invention.

FIG. 6 is a block diagram depicting a network architecture 600 in which client systems 610, 620 and 630, as well as storage servers 640A and 640B (any of which can be implemented using computer system 510), are coupled to a network 650. Storage server 640A is further depicted as having storage devices 660A(1)-(N) directly attached, and storage server 640B is depicted with storage devices 660B(1)-(N) directly attached. Storage servers 640A and 640B are also connected to a SAN fabric 670, although connection to a storage area network is not required for operation of the invention. SAN fabric 670 supports access to storage devices 680(1)-(N) by storage servers 640A and 640B, and so by client systems 610, 620 and 630 via network 650. Intelligent storage array 690 is also shown as an example of a specific storage device accessible via SAN fabric 670.

With reference to computer system 510, modem 547, network interface 548 or some other method can be used to provide connectivity from each of client computer systems 610, 620 and 630 to network 650. Client systems 610, 620 and 630 are able to access information on storage server 640A or 640B using, for example, a web browser or other client software (not shown). Such a client allows client systems 610, 620 and 630 to access data hosted by storage server 640A or 640B or one of storage devices 660A(1)-(N), 660B(1)-(N), 680(1)-(N) or intelligent storage array 690. FIG. 6 depicts the use of a network such as the Internet for exchanging data, but the present invention is not limited to the Internet or any particular network-based environment.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of computer system 510). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof. For example, specific electronic components can be employed in an application specific integrated circuit or similar or related circuitry for implementing the functions associated with one or more of the described functional blocks.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include computer-readable storage media, transmission type media such as digital and analog communications links, as well as media storage and distribution systems developed in the future.

The above-discussed embodiments can be implemented by software modules that perform certain tasks. The software modules discussed herein may include script, batch, or other executable files. The software modules discussed herein may further include one or more sets of instructions executable by a processor configured to execute such instructions. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A computer-implemented method comprising:
 receiving a request at a computer system, wherein
  the request comprises
   a request to restore a selected object from a backup of a database,
  the database comprises a plurality of objects, and
  the plurality of objects comprises
   the selected object;
 locating information in the backup using a processor of the computer system, wherein
  the information is associated with the selected object,
  the locating is performed using database table metadata,
  the database table metadata was gathered from the database, and
  the database table metadata was gathered at the time the backup was created; and
 restoring the selected object using the processor, wherein
  the restoring is performed using the information associated with the selected object, and the restoring comprises
restoring one or more necessary objects,
the selected object is one of a plurality of objects,
the plurality of objects comprises the one or more necessary objects,
one or more of a plurality of data relationships describes a relationship between each of the plurality of objects and another of the plurality of objects,
each of the one or more necessary objects is necessary to restore the selected object, by virtue of a relationship between the each of the one or more necessary objects and the selected object,
the relationship between the each of the one or more necessary objects and the selected object is described by at least one of the plurality of data relationships, and
the restoring restores all such necessary objects.

2. The method of claim 1 wherein
the information comprises
information regarding each of the at least one of the plurality of data relationships, and
information regarding the selected object,
the plurality of data relationships describes a hierarchy of objects, and
each of the plurality of objects is a member of the hierarchy of objects.

3. The method of claim 2, wherein
an object is necessary to restore the selected object
if the object is above the selected object in the hierarchy of objects, and
if the object was not previously restored.

4. The method of claim 1, wherein the database table metadata comprises:
an offset to a database table stored in the backup, wherein
the database table comprises
information describing the selected object.

5. The method of claim 4, wherein the database table metadata further comprises:
information describing a structure of the database table.

6. The method of claim 4, wherein
a plurality of database tables comprises the database table, and
each of the plurality of database tables comprises
at least a portion of the information describing the selected object.

7. The method of claim 1, further comprising:
performing a backup operation on the database; and
storing the database table metadata.

8. The method of claim 7, wherein
the database comprises
a SharePoint content database, and
the database table metadata comprises
information describing one or more tables in the SharePoint content database.

9. The method of claim 8, wherein the one or more tables in the SharePoint content database comprise:
one or more of
a Sites table,
a Webs table,
a Lists table,
a UserData table,
a UserInfo table,
a Groups table, and
a Roles table.

10. A system comprising:
a central processor; and
a computer-readable storage medium, wherein
the computer-readable storage medium is coupled to the central processor,
the computer-readable storage medium stores
a first storage object, wherein
the first storage object is configured to store a backup of a database, and
the database comprises
a plurality of objects, and
a plurality of database tables describing the plurality of objects, and
a second storage object, wherein
the second storage object is configured to store a target storage area, and
the target storage area is configured to store objects restored from the backup,
the computer-readable storage medium stores instructions executable by the processor, and
the instructions are configured to cause the central processor to receive a request, wherein
the request comprises
a request to restore a selected object from the backup,
the database comprises the plurality of objects, and
the plurality of objects comprises
the selected object,
locate information in the database backup, wherein
the information is associated with the selected object,
the instructions configured to cause the central processor to locate are configured to use database table metadata,
the database table metadata was gathered from the database, and
the database table metadata was gathered at the time the backup was created, and
restore the selected object to the second storage object, wherein
the instructions configured to cause the central processor to restore are configured to use the information associated with the selected object, and
the instructions configured to cause the central processor to restore comprise instructions configured to cause the central processor to restore one or more necessary objects,
the selected object is one of a plurality of objects,
the plurality of objects comprises the one or more necessary objects,
one or more of a plurality of data relationships describes a relationship between each of the plurality of objects and another of the plurality of objects,
each of the one or more necessary objects is necessary to restore the selected object, by virtue of a relationship between the each of the one or more necessary objects and the selected object,
the relationship between the each of the one or more necessary objects and the selected object is described by at least one of the plurality of data relationships, and
the instructions configured to cause the central processor to restore the one or more necessary objects is configured to restore all such necessary objects.

11. The system of claim 10, wherein
the information comprises
information regarding each of the at least one of the plurality of data relationships, and
information regarding the selected object,
the plurality of data relationships describes a hierarchy of objects, and
each of the plurality of objects is a member of the hierarchy of objects.

12. The system of claim 11, wherein
an object is necessary to restore the selected object
if the object is above the selected object in the hierarchy of objects, and
if the object was not previously restored.

13. The system of claim 10, wherein the database table metadata comprises:
an offset to a database table stored in the backup, wherein the database table comprises information describing the selected object.

14. The system of claim 13, wherein the database table metadata further comprises:
information describing a structure of the database table.

15. The system of claim 13, wherein
a plurality of database tables comprises the database table, and
each of the plurality of database tables comprises at least a portion of the information describing the selected object.

16. The system of claim 10, wherein
the database comprises
a SharePoint content database, and
the database table metadata comprises
information describing one or more tables in the SharePoint content database.

17. A computer program product encoded on non-transitory computer-readable storage medium comprising:
a plurality of instructions, comprising
a first set of instructions, executable by a processor, and configured to receive a request, wherein
the request comprises
a request to restore a selected object from a backup of a database,
the database comprises a plurality of objects, and
the plurality of objects comprises
the selected object,
a second set of instructions, executable by the processor, and configured to locate information in the backup, wherein
the information is associated with the selected object,
the second set of instructions comprises further instructions configured to use database table metadata,
the database table metadata was gathered from the database, and
the database table metadata was gathered at the time the backup was created, and
a third set of instructions, executable by the processor, and configured to restore the selected object to a target storage, wherein
the third set of instructions are configured to use the information associated with the selected object, and
the third set of instructions comprises
a first subset of instructions, executable by the processor, and configured to restore one or more necessary objects,
the selected object is one of a plurality of objects,
the plurality of objects comprises the one or more necessary objects,
one or more of a plurality of data relationships describes a relationship between each of the plurality of objects and another of the plurality of objects,
each of the one or more necessary objects is necessary to restore the selected object, by virtue of a relationship between the each of the one or more necessary objects and the selected object,
the relationship between the each of the one or more necessary objects and the selected object is described by at least one of the plurality of data relationships, and
the third set of instructions is configured to restore all such necessary objects.

18. The computer program product of claim 17, wherein
the information comprises
information regarding each of the at least one of the plurality of data relationships, and
information regarding the selected object,
the plurality of data relationships describes a hierarchy of objects, and
each of the plurality of objects is a member of the hierarchy of objects.

19. The computer program product of claim 18, wherein
an object is necessary to restore the selected object
if the object is above the selected object in the hierarchy of objects, and
if the object was not previously restored.

20. The computer program product of claim 17, wherein the database table metadata comprises:
an offset to a database table stored in the backup, wherein the database table comprises
information describing the selected object; and
information describing a structure of the database table.

* * * * *